(No Model.)
G. T. SMALLWOOD.
PUZLLE.
No. 595,283.   Patented Dec. 7, 1897.
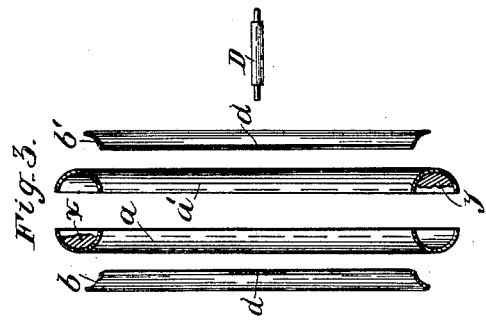
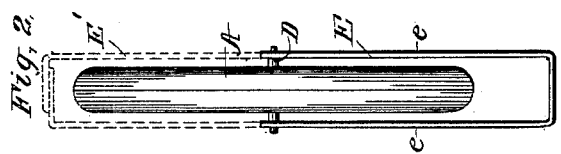
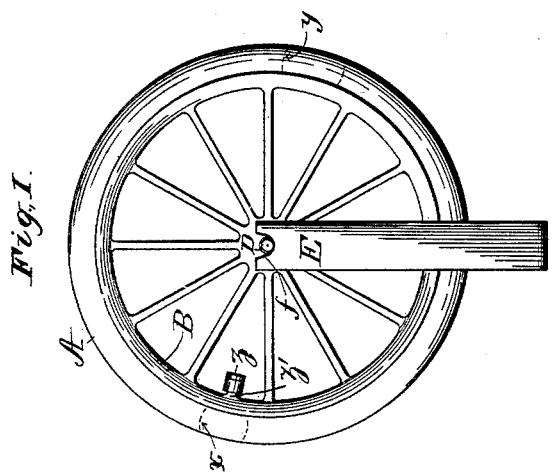
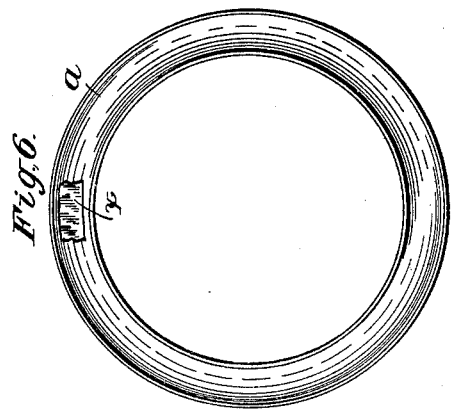
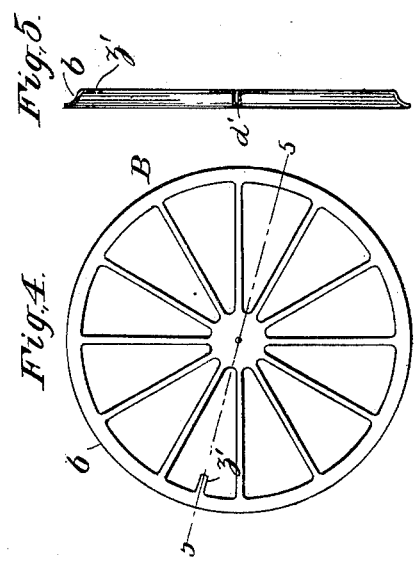
Witnesses.
W. R. Edelen.
Inventor.
George T. Smallwood
by P. Cameron
his attorney

UNITED STATES PATENT OFFICE.

GEORGE T. SMALLWOOD, OF WASHINGTON, DISTRICT OF COLUMBIA.

PUZZLE.

SPECIFICATION forming part of Letters Patent No. 595,283, dated December 7, 1897.

Application filed September 20, 1897. Serial No. 652,298. (No model.)

*To all whom it may concern:*

Be it known that I, GEORGE T. SMALLWOOD, a citizen of the United States, residing at Washington, in the District of Columbia, have invented certain new and useful Improvements in Toys or Puzzles; and I do hereby declare the following to be a full, clear, and exact description of the invention, such as will enable others skilled in the art to which it appertains to make and use the same.

My invention relates to a toy or puzzle; and the object of the invention is to produce a puzzle which shall afford amusement in the effort to solve the same.

To this end the invention consists in a body—a wheel or a disk, for example—hung to turn on an axis and having adjustable counterbalancing weights connected therewith, which weights are capable of being so adjusted that the body will be perfectly balanced, and hence will remain stationary at any point at which it may be stopped when revolving on its axis, whereas if the weights are not so adjusted as to counterbalance the body will only remain stationary when the center of gravity of the entire mass is immediately above or below the axis of revolution. In its preferred form my invention is made in the shape of a bicycle-wheel having a pneumatic tire, the tire being divided circumferentially into halves, which are independently adjustable around the rim of the wheel.

In the drawings forming part of this specification, Figure 1 is a side elevation of a wheel embodying my invention mounted to turn in a suitable support or bearing. Fig. 2 is an elevation at right angles to Fig. 1. Fig. 3 is a sectional view of the rim, tire, and axis of the wheel, showing the manner of constructing the same and applying the weights thereto. Fig. 4 is a side elevation of one of the halves of the wheel with the tire omitted. Fig. 5 is a sectional view on the line 5 5 of Fig. 4, and Fig. 6 is a view showing the inner concave surface of one of the circumferential halves of the tire with one of the weights attached thereto.

Like letters of reference apply to like parts throughout the several views, wherein—

A represents the tire of the wheel, and B the rim. The rim B may for convenience in manufacture be made in two separate parts $b\ b'$, Fig. 3, stamped up out of sheet metal, so as to form when the two parts $b\ b'$ are assembled the usual concave groove for the reception of the tire A. One of the parts of the rim, as $b$, Fig. 4, may have the spokes and hub made integral therewith and the other portion of the rim $b'$ attached thereto after the tire is placed in position, or alternate spokes with half of the hub may be attached to the part $b$ of the rim and the remaining spokes and half of the rim be attached to the part $b'$ of the rim. Whether the hub and spokes are connected to the two parts of the rim or all connected to the one part, the wheel is assembled by placing the two parts $b\ b'$ of the rim on the opposite sides of the tire and securing the parts thus assembled by soldering or otherwise fastening the two sections of the rim together. Where each portion of the rim carries part of the spokes, as indicated above, the parts may be secured by means of clamping-nuts on the axis D on opposite sides of the hub. I prefer, however, to connect the parts by solder. If desired, the wheel may be stamped out with one-half of each spoke and one-half of each hub connected to each of the rim portions $b\ b'$ and then secured together with the tire between them. The tire A is divided circumferentially into halves $a\ a'$, which may also be formed of stamped sheet metal.

D is a pin which is inserted through the axial openings $d$ in the wheel.

Weights $x$ and $y$ are attached to the inner concave sides of the two sections $a\ a'$ of the tire A, and $z$ is a weight, shown in the form of the usual pneumatic valve, on the rim of the wheel. These several weights, $x$, $y$, and $z$, are so proportioned that the sum of $z$ and one of the others, as $x$, shall equal the remaining weight, as $y$. (See dotted lines, Fig. 1.)

In forming one part of the rim, as $b$, an inwardly-projecting pin or teat $z'$ is left, (see Figs. 4 and 5,) to which the lead or other material forming the weight $z$ may be conveniently attached.

Instead of using the pin D as the axis I may form the axis of two pins or lugs $d'$, projecting from the opposite sides of the center of the hub, as shown in Fig. 5. These pins or lugs $d'$ may be struck integral with the hub or be connected thereto with solder or otherwise.

Any suitable bearing may be provided for the axis of the wheel to turn in. I have shown a bent metal strip E, having the two upright members $e\ e$ parallel to each other and a sufficient distance apart to permit the wheel to turn freely between them. These members $e\ e$ may be extended, as shown in dotted lines E', Fig. 2, in which case the axis of the wheel would rest in suitable holes or perforations in the members $e\ e$.

The operation of the device is as follows: The parts of the wheel being properly assembled, the two parts $a\ a'$ of the tire A may be independently turned on the rim B, so that the weights $x$ and $y$ shall occupy any desired position relative to each other and to the weight $z$. If the weight $y$ is placed at a point on the rim diametrically opposite the weight $z$ and the weight $x$ immediately adjacent to $z$, as is clearly indicated in dotted lines in Fig. 1, the wheel will be exactly balanced, since $x+z$ is equal to $y$, and consequently the wheel when revolved may be stopped at any point of its revolution and it will remain stationary, whereas if the weights are arranged in any other relation the center of gravity of the wheel will be outside of its axis, and when free to do so it will turn till its center of gravity is below the axis. There is but one exception to this, and that is when the wheel is placed so that the center of gravity is immediately above the axis. In this position the wheel will remain stationary. It is thus apparent that with the weights occupying any relative positions, except as indicated in Fig. 1, the wheel can be made to stand stationary in but two positions, whereas with the weights arranged so as to balance, as indicated in Fig. 1, the wheel will remain stationary in any position in which it may be placed.

The puzzle consists in so adjusting the sections $a\ a'$ of the tire that the wheel will be balanced at all points, and since the weights are concealed their relative size and even their existence is unknown to the operator. This, in connection with the fact that the operator is liable to fail to appreciate that the weight $z$ is in fact a weight, makes it quite difficult to solve the problem.

It will of course be understood that I have shown the invention in the form of a bicycle-wheel for the purpose of illustration only, and that my invention may be embodied in any form in which a body is hung to turn around an axis and is provided with adjustable weights, whereby the center of gravity of the body may be located within or without the axis of the body.

Having described my invention, what I claim as new is—

1. In a toy or puzzle, the combination of a wheel hung to turn on an axis and having a weight located at one side of said axis, with a movable tire having a counterbalancing-weight connected thereto, substantially as described.

2. In a toy or puzzle, the combination of a wheel hung to turn on an axis and having a weight connected to its rim, with a tire divided into circumferential halves adjustable on said rim and having weights attached thereto, substantially as described.

3. In a toy or puzzle, the combination of a wheel hung to turn on an axis and having a weight connected to its rim, with a tire divided into circumferential halves adjustable on said rim, and a weight on each half of the tire, the weight on one half of the tire being equal to the sum of the weights on the rim and the other half of the tire, substantially as described.

4. In a toy or puzzle, a body hung to turn on an axis, in combination with visible and invisible weights for balancing the same on said axis, substantially as described.

In testimony whereof I have affixed my signature in presence of two witnesses.

GEO. T. SMALLWOOD.

Witnesses:
S. T. CAMERON,
REEVE LEWIS.